Patented May 3, 1938

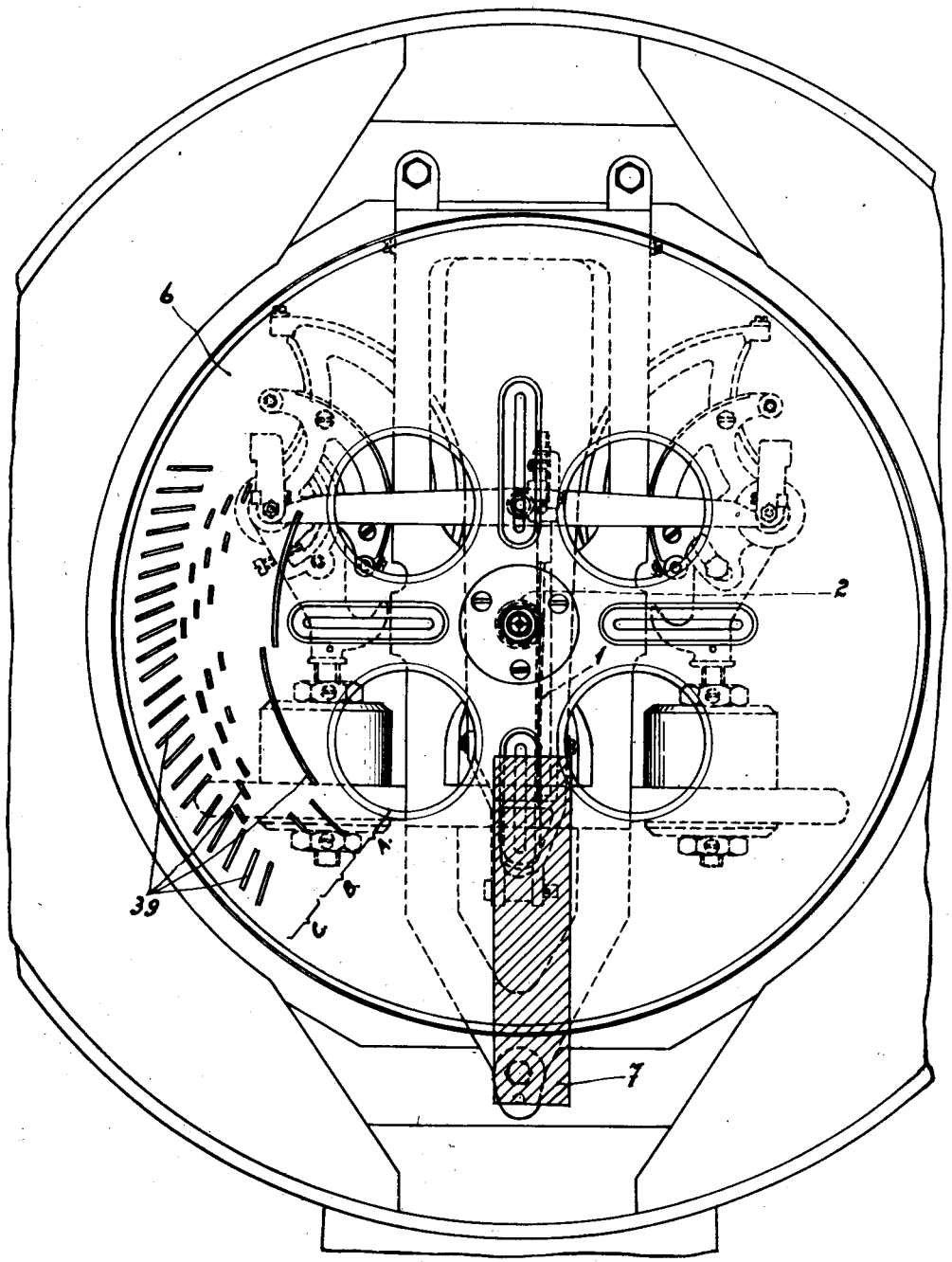

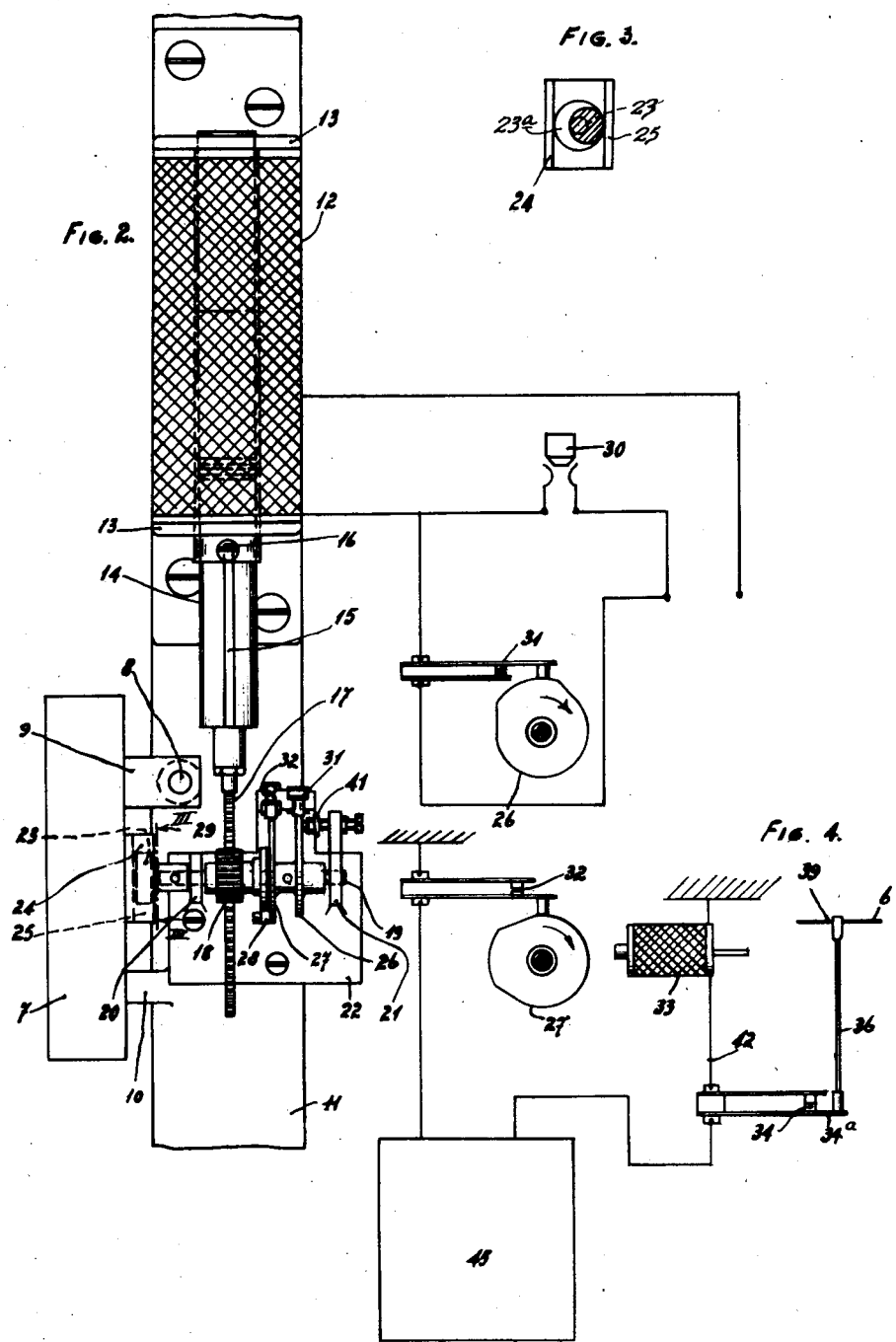

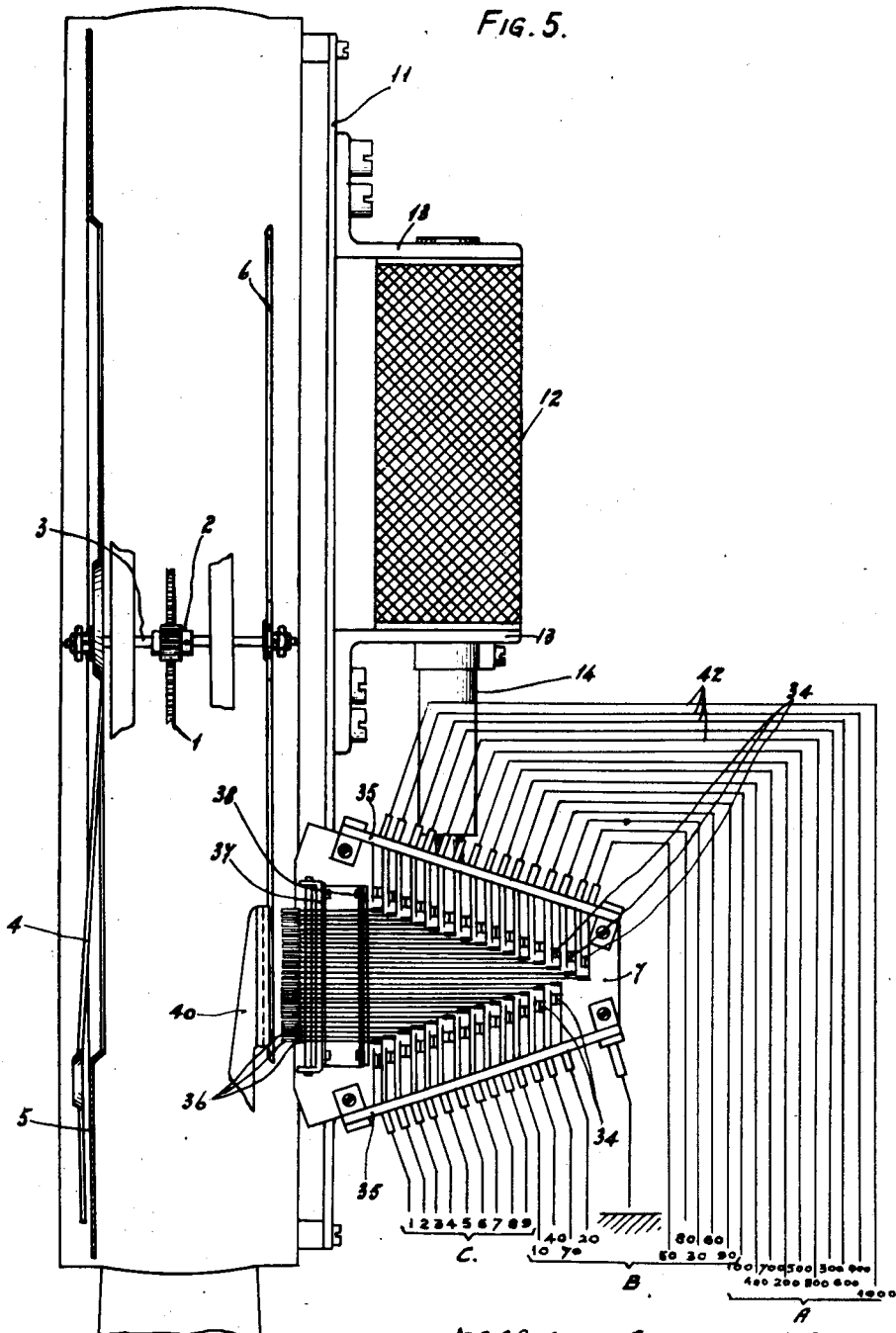

2,116,086

UNITED STATES PATENT OFFICE 2,116,086

REGISTERING OR RECORDING DEVICE FOR WEIGHING APPARATUS

Wilhelmus Adrianus van Berkel, Brussels, Belgium

Application October 28, 1936, Serial No. 108,061
In Great Britain July 17, 1936

10 Claims. (Cl. 234—5.4)

This invention relates to weighing apparatus in combination with a machine for registering and recording (as for example by printing) the weight, said machine being located on, or away from, the weighing apparatus as desired, and the object of the invention is to provide improved detecting means for operating the registering machine in accordance with the weight indicated by the weighing apparatus.

An object of the invention is to provide detecting means for electrically transmitting the weight indication of a weighing apparatus, and which comprises a plurality of individually movable feelers each associated with a pair of electric contacts in a circuit including an operating device for the corresponding key of a registering machine, and main switch means, controlling said circuits and operated before the feelers are operated to close or open said contacts which are thus always opened or closed when "dead" and sparking and damage to the delicate contacts is thus avoided.

The feelers are preferably arranged on a non-rotatable member or carriage while the spaced apertures are provided on a rotatable member, such for example as a disc, the carriage and disc being relatively movable towards each other, as for example by reciprocally mounting the carriage to bring the feelers into contact with the disc and effect the detecting operation.

The invention will now be described by way of example with reference to the accompanying drawings in which:—

Fig. 1 is a back view of the upper part of an automatic weighing scale having detecting means in accordance with the invention.

Fig. 2 is a side view of the detecting means, certain parts being shown again at right angles to show more clearly certain electrical connections.

Fig. 3 is a detail view on the line III—III of Fig. 2.

Fig. 4 is a diagrammatic detail view, and

Fig. 5 is a part sectional side elevation corresponding to Fig. 1.

Referring to Figs. 1 and 5, the weighing mechanism is of known type and includes the rack 1 and pinion 2 on the spindle 3 carrying the usual indicator 4 co-operating with the scale 5. On the rear end of the spindle 3 is mounted the rotatable member or disc 6 provided with spaced apertures (Fig. 1) described later.

The feelers, which will also be described later are mounted on a carriage 7 (see also Fig. 2) adapted to be moved towards and away from the disc 6 on a guide pin 8 engaged by a lug 9 on the carriage 7 and on a projection 10, the pin and projection being provided on a diametral support plate 11 attached to the rear of the scale casing. The to-and-fro movement of the carriage 7 is effected by means of a solenoid or electromagnet 12 mounted on brackets 13 and having a core 14 with a guide 15 engaging a projection 16 to prevent rotation of the core. At the lower end of the core a rack 17 is provided which engages with a pinion 18 freely turnable on the spindle 19 mounted in bearings 20, 21 on the plate 22 attached to the support 11. An eccentric pin 23 is provided at one end of the spindle 19 and engages with a roller bearing device 23a engaging with two abutments 24, 25 on the carriage 7 to produce the to-and-fro movement thereof (Fig. 3).

Two cams 26 and 27 are fixed on the spindle 19 and a pawl 28 on the cam 27 engages a ratchet disc 29 attached to the pinion 18 and constitutes a one-way drive between the solenoid 12 and the carriage 7 such that during part of the upward stroke of the core or armature 14 the carriage is moved towards the disc 6 by the cam 23 but is not in operative connection during the downward stroke of the core.

As shown in Fig. 2 the solenoid coil is connected to the main supply circuit and is controlled by two switches in parallel, one being the manually operable switch 30 and the other the spring contact switch 31 controlled by the cam 26. After the switch 30 has been released the current is maintained in the solenoid coil by the switch 31 which is closed by the cam 26 and maintained closed during the full stroke of the armature 14.

The cam 27 also co-operates with a spring contact or switch 32 (Fig. 2) located on a circuit including the twenty-eight electromagnets 33 for operating the respective finger keys of the registering machine, which is not shown and which is, or may be, (see British Patent No. 465,971) of known type and adapted to register and record the weight. Each electromagnet or solenoid 33 is connected (as shown in Figs. 4 and 5) to a corresponding spring contact or switch 34 mounted on one of the two insulating plates 35 mounted in substantially V formation on the carriage 7 (Fig. 5). The spring arm 34a of each switch is adapted to co-operate with a feeler 36 consisting of a thin needlelike member having enlarged ends. The feelers 36 are slidably guided in apertured plates 37, 38 mounted on the carriage 7 (Fig. 5) and all twenty-eight of them are disposed in a straight line and are adapted to co-operate with the apertures 39 in the disc 6 (Figs. 1 and 4). These apertures are divided into three groups A, B and C (Fig. 1) respectively representing weight values bearing the relation 100, 10 and 1. The inmost group A consists of 10 arcuate slots each corresponding to say 100 units and adapted to co-operate with the corresponding feeler 36 of the group of ten feelers denoted by A in Fig. 5, the slots being arranged at radii which increase an amount equal to the distance between two adjacent feelers 36. Group B consists of a group of nine slots corresponding to each slot of group A. In similar manner the slots of group B are arranged at different radii to co-operate only with the respective feeler 36 of the group of nine feelers denoted by B (Fig. 5) and the slots each represent 10 units and are spread out so that each group subtends an angle at the centre equal to nine-tenths of that subtended by the corresponding slot of group A. Group C consists of a number of slots arranged as parts of chords to the disc and each subtending an angle at the centre of the disc equal to nine-tenths of that subtended by the corresponding slot of group B. Each of the slots of group C represents 1 unit and is adapted to co-operate with any one of the feelers in group C (Fig. 5) depending upon where the slot intersects this row of nine feelers C (Fig. 5).

A shore or support 40 (Fig. 5) is provided to support the disc 6 when the feelers are moved against same and an adjustable friction brake 41 (Fig. 2) co-operating with the cam 26 is provided to prevent too rapid rotation of this cam and the cam 27.

As regards the contacts 34, each is connected to the corresponding electromagnet 33 of the registering machine by a conductor 42. The slots of group B, and if desired, those of group A, are arranged in sub groups of three, that is, the radii of successive slots do not increase progressively proceeding round the disc. The contacts 34 are correspondingly arranged, as shown in Fig. 5.

In operation, when a load is placed upon the scale pan, the pointer 4 rotates to the appropriate position together with the disc 6 and when the same has come to rest, the switch 30 is closed, to energize the solenoid 12 which pulls up the core 14. The pinion 18 is rotated and also the cams 26 and 27 by means of the free wheel device 28, 29. The "fall" or lower part of cam 26 closes the switch 31 and keeps the circuit of the solenoid closed during the full stroke notwithstanding the fact that switch 30 opens as soon as released. During this upward stroke the cam 23 (Fig. 3) pushes the carriage 7 towards the disc 6 so that the feelers 36 come against the disc 6. One of each group passes through the corresponding slots, while the others are retained by the disc and so open their contacts 34 by pressing back the arms 34ᵃ. The rise of cam 27 then closes the switch 32 when the feelers are in contact with the disc and current, at a voltage of 20 volts supplied from the transformer 45, passes through the contact 32 and through those contacts 34 corresponding to the feelers 36 which have passed through slots in the disc 6, and operates the corresponding electromagnets 33 of the registering machine. These in turn operate the keys thereof and so register the weight in three figures, that is, hundreds, tens and units which may be printed. As the core 14 completes its stroke the contact 32 is opened, the carriage 7 is drawn back and the contact 31 is opened, in that order, so that at the end of the stroke the spindle 19 has completed one revolution and the apparatus is back at the initial position. On opening of the switch 31 the solenoid is de-energized and the core falls back to the bottom position, ready for another detecting operation, being so allowed, by the free wheel device 28, 29.

The above description has been given merely by way of example and it will be understood that modifications may be made without departing from the scope of the invention.

I claim:—

1. Detecting means for electrically transmitting the weight indication of a weighing apparatus, comprising a rotatable member connected to a load-influenced element of the weighing apparatus, angularly and radially spaced elements in said member corresponding to the weight values, a plurality of individually movable feelers each associated with a corresponding contact switch in an electric circuit, and mounted on a reciprocable carriage, a spindle, an electromagnet, a rack and pinion drive from the electromagnet plunger to said spindle, and means on said spindle for reciprocating the carriage, the feelers which register with the spaced elements and the others being moved relatively so that the associated contact switches are selectively operated and the corresponding circuits are selectively open or closed.

2. Detecting means for electrically transmitting the weight indication of a weighing apparatus, comprising a rotatable member connected to a load-influenced element of the weighing apparatus, angularly and radially spaced elements in said member corresponding to the weight values, a plurality of individually movable feelers each associated with a corresponding contact switch in an electric circuit, and all mounted on a reciprocable carriage, a spindle, an electromagnet, a drive from the electromagnet to said spindle, means on said spindle for reciprocating the carriage, the feelers which register with the spaced elements and the others being moved relatively so that the associated contact switches are selectively operated and the corresponding circuits are selectively open or closed, an electrical supply, switch means for connecting said supply to the circuits associated with said feelers and means on said spindle for closing said switch means when the feelers are in register with the spaced elements.

3. Detecting means for electrically transmitting the weight indication of the weighing apparatus, comprising a rotatable member connected to a load-influenced element of the weighing apparatus, angularly and radially spaced elements in said member corresponding to the weight values, a plurality of individually movable feelers, each associated with a contact switch in an electric circuit, and all mounted on a reciprocable carriage, a spindle operatively connected to the armature of an electromagnet, an electric circuit for the magnet windings, a hand switch in said circuit, a further switch in parallel with the hand switch and means on said spindle for keeping the further switch closed during the full stroke of the armature after the hand switch has been opened.

4. Detecting means in weighing apparatus for electrically signalling the weight of the load to a registering machine comprising a rotatable member driven from a load-influenced element, elements on said member spaced radially and angularly to represent weight values within the range of the apparatus, individually movable feelers on a reciprocable carriage, a spindle, an electromagnet with a plunger having a one-way driving connection with the spindle, means on the latter for reciprocating the carriage and brake means to control the plunger stroke.

5. Detecting means for electrically operating a recording machine in accordance with the weight indicated on a weighing apparatus, comprising a disc mounted on the indicating spindle of said apparatus, a plane surface on said disc interrupted by apertures spaced radially and angularly to represent weight values within the range of the apparatus, a reciprocable carriage carrying a plurality of individually movable feelers each associated with a spring contact in an electrical circuit including an actuating device for the corresponding key of the machine, a source of electrical supply for said circuits and a main control switch therefor, a spindle having a one-way driving connection with the armature of an electromagnet an electric circuit including the windings of that electromagnet, a hand switch and an auxiliary switch in parallel with the hand switch in said circuit, eccentric means on said spindle for reciprocating the carriage, a cam adapted to keep said auxiliary switch closed after the hand switch has been opened, a further cam on the spindle adapted to close said main control switch when the feelers are in contact with the disc and to supply current to all the key-actuating devices except those corresponding to feelers which have been pushed back by engaging the plane surface of the disc.

6. The combination of weighing apparatus and a key-operable machine for registering and recording the weight, comprising a disc mounted on the indicating spindle of said apparatus, a plane surface on said disc interrupted by apertures spaced radially and angularly to represent weight values within the range of the apparatus, a reciprocable carriage carrying a plurality of individually movable feelers each associated with a spring contact in an electrical circuit including an electromagnet for actuating the corresponding key of the machine, a source of electrical supply for said circuits and a main control switch therefor, a spindle having a one-way driving connection with the armature of a driving electromagnet, an electric circuit including the electromagnetic windings, a hand switch and an auxiliary switch in parallel with the hand switch, eccentric means on said spindle for reciprocating the carriage, a cam adapted to keep said auxiliary switch closed after the hand switch has been opened, a further cam on the spindle adapted to close said main control switch when the feelers are in contact with the disc and to supply current to all the key-actuating devices except those corresponding to feelers which have been pushed back by the plane surface of the disc, shoring means at the other side of the disc to support same against the pressure of the feelers and brake means to control the stroke of the electromagnet.

7. Detecting means for electrically transmitting the weight indication of a weighing apparatus, comprising a rotatable member connected to a load-influenced element of the weighing apparatus, spaced elements on said member corresponding to the weight values, a plurality of individually movable feelers each associated with a pair of electric contacts in a circuit including an operating device for the corresponding key of a registering machine, means for moving said feelers and the rotatable member into and out of contact so that the feelers which register with the spaced elements are moved relatively to the others and the circuits are selectively closed by the corresponding contacts, and switch means, operated by said means, so as to close after the feelers and spaced elements have come into register and supply electricity to said circuits as are closed after the electrical contacts have been operated in order to operate the corresponding devices and said switch being also operated by said means so as to open before the contacts are again operated by said means causing the rotatable members and feelers to move away from each other.

8. Detecting means for electrically transmitting the weight indication of a weighing apparatus, comprising a rotatable member connected to a load-influenced element of the weighing apparatus, angularly and radially spaced elements on said member corresponding to the weight values, a plurality of individually movable feelers each associated with a corresponding contact switch in an electric circuit, and mounted on a carriage, said carriage and member being relatively movable to and from each other by an electromagnet which completes a to-and-fro movement of the carriage and said member by one stroke of its plunger, the feelers which register with the spaced elements and the others being moved relatively so that the associated contact switches are selectively operated and the corresponding circuits are selectively open or closed.

9. Detecting means for electrically transmitting the weight indication of a weighing apparatus, comprising a rotatable member connected to a load-influenced element of the weighing apparatus, angularly and radially spaced elements in said member corresponding to the weight values, a plurality of individually movable feelers each associated with a corresponding contact switch in an electric circuit, and all mounted on a carriage between which and said rotatable member there is relative to and fro movement, a spindle, an electromagnet, a drive from the electromagnet to said spindle, means on said spindle for causing said to and fro movement of the carriage and said member, the feelers which register with the spaced elements and the others being moved relatively so that the associated contact switches are selectively operated and the corresponding circuits are selectively open or closed, an electrical supply, switch means for connecting said supply to the circuits associated with said feelers and means on said spindle for closing said switch means when the feelers are in register with the spaced elements.

10. Detecting means in weighing apparatus for electrically signalling the weight of the load to a registering machine comprising a rotatable member driven from a load-influenced element, elements on said member spaced radially and angularly to represent weight values within the range of the apparatus, individually movable feelers on a carriage, a spindle, an electromagnet with a plunger having a one-way driving connection with the spindle, means on the latter for relatively moving the rotatable member and the carriage to and from each other on one stroke of the plunger and brake means to control the plunger stroke.

WILHELMUS ADRIANUS VAN BERKEL.